C. E. SMITH.
BELT CLASP.
APPLICATION FILED APR. 6, 1909.
953,927.
Patented Apr. 5, 1910.
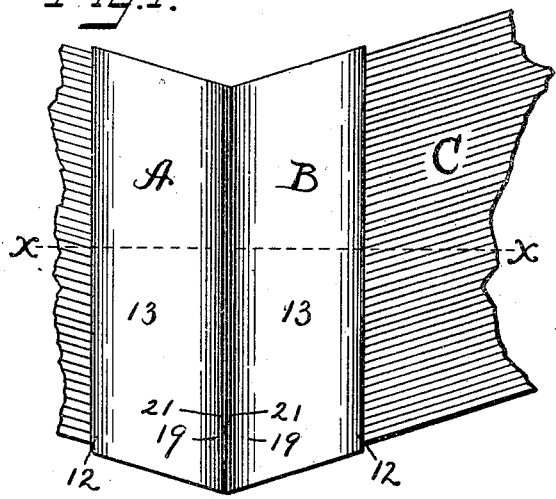
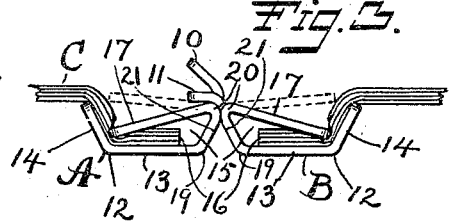
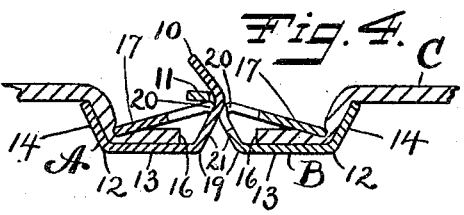
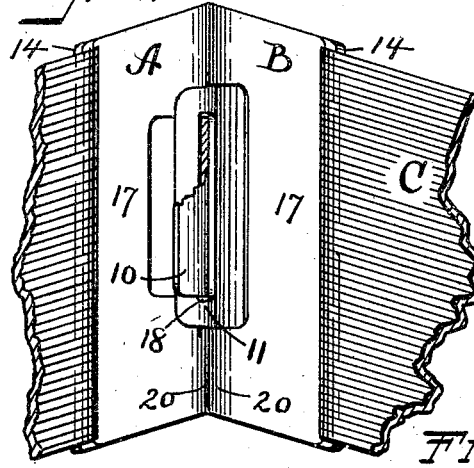
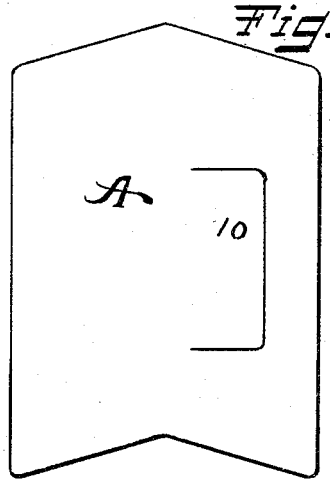
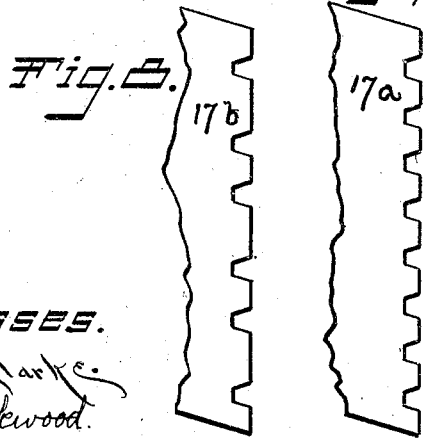
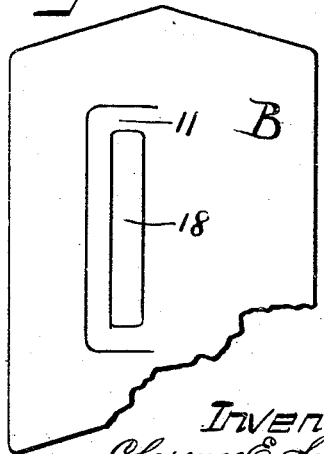
Witnesses.
S. H. Clarke
N. Lockwood
Inventor.
Clarence E. Smith.
By Louis M. Schmidt
Atty.

UNITED STATES PATENT OFFICE.

CLARENCE E. SMITH, OF NEW BRITAIN, CONNECTICUT, ASSIGNOR TO THE NORTH AND JUDD MANUFACTURING COMPANY, OF NEW BRITAIN, CONNECTICUT, A CORPORATION.

BELT-CLASP.

953,927.  Specification of Letters Patent.  Patented Apr. 5, 1910.

Application filed April 6, 1909. Serial No. 488,175.

*To all whom it may concern:*

Be it known that I, CLARENCE E. SMITH, a citizen of the United States, residing at New Britain, in the county of Hartford and State of Connecticut, have invented certain new and useful Improvements in Belt-Clasps, of which the following is a specification.

My invention relates to improvements in belt clasps, and the objects of my improvements are simplicity and economy in construction and convenience and efficiency in use.

In the accompanying drawing: Figure 1 is a front elevation of my belt clasp, and part of the webbing. Fig. 2 is a rear elevation of the same. Fig. 3 is a top view of the same. Fig. 4 is a sectional view on the line $x\ x$ of Fig. 1. Fig. 5 is the development of the hook element of my belt clasp. Fig. 6 is the development of the eye element of my belt clasp. Fig. 7 shows a portion of a modification of my belt clasp. Fig. 8 shows a portion of another modification.

My improved belt clasp comprises a pair of engaging members, respectively a hook member A having a hook 10 and an eye member B having an eye 11, each made of a single piece of sheet metal, the said hook 10 being adapted to engage with the said eye 11. The sheet metal pieces or blanks of which the said hook member A and eye member B are formed are similar and essentially rectangular, in case an ordinary straight away effect is desired when the said hook member A and eye member B are united normally by means of said hook 10 engaging said eye 11. In special cases as when an angular effect is desired, such as shown in the accompanying drawing, involving a right and left handed formation of the respective hook member A and eye member B the said blanks have other formations than rectangular. A webbing or strap C is attached by its ends to the webbing ends of said hook member A and eye member B by means that will be hereinafter described, said webbing ends being remote from said hook 10 and eye 11 respectively. Said hook 10 is formed in the body of said hook member A by a three sided slit, two longitudinal slits connected at the end remote from the webbing with a vertical slit, so that the said hook 10 remains attached to and integral with the said body along its vertical edge at the side toward the webbing end of the said hook member A. At a point in the said eye member B corresponding with the location of the said hook 10 in said hook member A the said eye 11 is formed in the blank from which the said eye member B is formed by a three sided slit longer on its three sides but otherwise similar to the three sided slit in the said hook member A described above by which the said hook 10 was formed in the blank, and punching out a vertical slot 18 in the tongue thus formed by said three sided slit. Aside from the hook feature of the said hook member A and the eye feature of the said eye member B, the said hook member A and said eye member B are similar, except for features of being left handed or right handed. The said blank in each case respectively one for the said hook member A and one for the said eye member B are practically bent back on themselves approximately on the line of attachment of the said hook 10 and eye 11, and the webbing end bent backward at an obtuse angle 12 with the front wall 13, the said end between the apex of the said obtuse angle 12 and webbing end of the blank constituting the front clamping lip 14, the loop space 15 formed between the said front wall 13 and the back wall being adapted to receive the end 16 of the webbing C, the said back wall constituting the back clamping lip 17. The said back clamping lip 17 is directed toward the inner face of the said inclined front clamping lip 14 at an acute angle such that as the said back clamping lip 17 is bent forward the said acute angle approaches a right angle, and of such length that with the webbing C in place between the said clamping lips the end of the said back clamping lip 17 will clamp said webbing C against the said back face of said front clamping lip 14, the clamping pressure being increased as the said back clamping lip 17 is forced forward. The limit of the clamping pressure is reached when the end of the said back clamping lip 17 has been forced as close to the apex of the said obtuse angle 12 as the thickness of the webbing C will permit. The clamping pressure of the said clamping members on the said webbing C comprises a longitudinal clamping pressure of the said back clamping lip 17 opposed to a lateral pressure of the said front clamping lip 14.

In Fig. 3 the dotted lines show the position of the back clamping lip 17 before being bent forward to clamp the webbing C and the full lines show the final position with the webbing C in place. The webbing C passes backward from the point of clamping between the end of said back clamping lip 17 and the back face of said front clamping lip 14 along the said back face of the said front clamping lip 14 and laterally over the extreme edge of the same, which edge offers resistance to pulling out the said webbing C in addition to the clamping of the said clamping lips, as has been described. In general, the extreme pressure or bearing end of the said back clamping lip 17 may be straight and bear the webbing C against the normal plane surface of the sheet metal of the said front lip 14 and especially is this the case with woven fabrics. In special cases however with more rigid materials in place of the webbing, as for instance leather, it may be advantageous to roughen the surface of the said front lip 14 or even to provide serrated edges for the said pressure end of the said back clamping lip 17, as 17ᵃ shown in Fig. 7 or edges in part serrated, as 17ᵇ shown in Fig. 8. Whichever formation may be used for the said lips, the bite on the fabric or material is maintained essentially by the resiliency of the material of the said hook member A or eye member B, and no sewing is necessary, nor hook members for hooking into the fabric, and neither is it necessary to double or bend back the fabric for the purpose of securing the same, and no special tools of any kind are required for assembling. The operation of assembling consists simply of laying the end of the fabric C in the loop space 15 between the back clamping lip 17 and the front wall 13 and bending the said back clamping finger 17 forward either with the fingers, or possibly with a hammer or some simple implement. In bending back the blank in forming the said hook member A and eye member B, I prefer to make two distinct bends, one the front inner bend 19 a short distance in front of the said hook or said eye respectively, and the other the back bend 20 about on the line of attachment of the said hook 10 and eye 11 respectively, forming an abutment wall 21 between the same, so that all the walls will be essentially straight, including in order from end to end the said front clamping lip 14, the said front wall 13, the said abutment wall 21 and the said back clamping lip 17. The said hook 10 and eye 11 are brought out generally in line with the said abutment wall 21, the said hook 10 however being bent backward on itself sufficiently to form a hook and the said eye 11 bent somewhat in the direction of the said hook 10 for convenience in engaging the same. In use the said abutment walls 21 of the said hook member A and the said eye member B bear against one another and resist any tendency of tension on the webbing C to swing the front faces 13 forward out of alinement when the said hook 10 is engaged with said eye 11.

As described each of the respective members of my belt clasp is complete and self contained and has integral means for engaging with its mate and integral means for securing to the fabric, all without moving parts after final formation into shape and assembled, each of said means simple and reliable, and made in a simple manner from sheet metal.

I claim as my invention:

1. In a belt clasp formed of a strip of sheet metal and having integral means for permanent connection to a webbing, the said strip of metal bent back upon itself so as to form a loop having front and back loop members, the back loop member straight, having a butt end, and adapted to serve as a back clamping member, the said front loop member longer than and overhanging the said back loop member, the overhanging end of said front loop member bent backward at an obtuse angle so as to form a front clamping member, the back face of said front clamping member being opposed to the said butt end of said back clamping member and separated therefrom by a webbing receiving space, the angular relation of said clamping members being such that bending said back clamping member forward will reduce the said space and bring said back clamping member more nearly perpendicular to the said front clamping member.

2. A belt clasp complete and self contained comprising a box-like structure having at one end means for engaging with its mate, adjoining said means an abutment wall, extending from the back edge of said abutment wall a back clamping member having an engaging end, extending from the front end of said abutment wall a front wall, and extending from the end of said front wall remote from said abutment wall a front clamping member, having a back face, the said front clamping member overhanging the said end of said back clamping member and adapted to exert a clamping pressure by the said back face in engagement with the said engaging end.

3. In a pair of belt clasps comprising a hook member and an eye member, each having a box-like structure and comprising a back clamping member 17, an abutment wall 21, means for engaging with its mate integral with the abutment wall adjacent said back clamping member, a front wall 13, and a front clamping member 14, the said back clamping member adapted to press by its end a webbing against the back face of said front clamping member, the said means comprising a hook on said hook member and an eye on said eye member adapted to engage with one another and when so engaged concealed from front view by said abutment wall and front wall.

CLARENCE E. SMITH.

Witnesses:
EDWARD HOFFMAN,
PETER F. O'DONNELL.